(12) United States Patent
Ravindran et al.

(10) Patent No.: US 10,142,332 B2
(45) Date of Patent: Nov. 27, 2018

(54) METHOD AND APPARATUS FOR A WEARABLE BASED AUTHENTICATION FOR IMPROVED USER EXPERIENCE

(71) Applicant: Samsung Electronics Co., Ltd., Suwon-si, Gyeonggi-do (KR)

(72) Inventors: Sourabh Ravindran, Dallas, TX (US); Vitali Loseu, Irving, TX (US); Michael Polley, Garland, TX (US); Manish Goel, Plano, TX (US); Kyong Ho Lee, Plano, TX (US); Seok-Jun Lee, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/589,741

(22) Filed: Jan. 5, 2015

(65) Prior Publication Data

US 2016/0197916 A1   Jul. 7, 2016

(51) Int. Cl.
  *H04L 29/06* (2006.01)
  *H04W 12/08* (2009.01)
  *H04W 12/06* (2009.01)

(52) U.S. Cl.
  CPC .......... *H04L 63/0861* (2013.01); *H04L 63/10* (2013.01); *H04W 12/06* (2013.01); *H04W 12/08* (2013.01)

(58) Field of Classification Search
  CPC ....... H04L 63/102; H04L 63/08; H04L 63/10; H04L 63/0876; H04W 12/06
  See application file for complete search history.

(56) References Cited

U.S. PATENT DOCUMENTS 8,371,501 B1    2/2013  Hopkins
8,731,472 B2 *  5/2014  Choi ..................... H04W 4/008
                                                        455/41.2
(Continued)

FOREIGN PATENT DOCUMENTS

JP    2006-179027 A    7/2006
JP    2006179027 A     7/2006
(Continued)

OTHER PUBLICATIONS

Notification of International Search Report and the Written Opinion of the International Searching Authority dated Apr. 5, 2016 in connection with International Application No. PCT/KR2015/014269, 11 pages.
(Continued)

*Primary Examiner* — Yonas A Bayou

(57) ABSTRACT

A wearable device is provided for authentication that includes a memory element and processing circuitry coupled to the memory element. The memory element configured to store a plurality of user profiles. The processing circuitry is configured to identify a pairing between the wearable device and a device. The processing circuitry is configured to identify a user of the wearable device. The processing circuitry also is configured to determine if the identified user matches a profile of the plurality of user profiles. The processing circuitry is also configured to responsive to the identified user matching the profile, determine if the profile provides authorization to access the device. The processing circuitry is also configured to responsive to the profile providing authorization to the device, send a message to the device authorizing access to the device.

17 Claims, 16 Drawing Sheets

Confidence measure in user being true user increases

(56) References Cited

U.S. PATENT DOCUMENTS

| | | | | |
|---|---|---|---|---|
| 9,544,759 | B2* | 1/2017 | Gargiulo | H04L 9/32 |
| 2002/0021622 | A1* | 2/2002 | Baroche | G04B 37/0016 |
| | | | | 368/10 |
| 2002/0160768 | A1* | 10/2002 | Gventer | H04M 1/24 |
| | | | | 455/423 |
| 2003/0025603 | A1* | 2/2003 | Smith | G06F 21/35 |
| | | | | 340/572.8 |
| 2003/0046228 | A1* | 3/2003 | Berney | G06F 21/32 |
| | | | | 705/41 |
| 2008/0216171 | A1* | 9/2008 | Sano | H04L 9/32 |
| | | | | 726/19 |
| 2011/0260830 | A1* | 10/2011 | Weising | G06F 3/015 |
| | | | | 340/5.52 |
| 2012/0007713 | A1* | 1/2012 | Nasiri | G06F 1/1694 |
| | | | | 340/5.81 |
| 2012/0317024 | A1* | 12/2012 | Rahman | G01K 13/002 |
| | | | | 705/42 |
| 2013/0159705 | A1* | 6/2013 | Leedom, Jr. | H04L 63/068 |
| | | | | 713/156 |
| 2013/0268766 | A1 | 10/2013 | Schrecker | |
| 2014/0085050 | A1 | 3/2014 | Luna | |
| 2014/0282878 | A1* | 9/2014 | Ignatchenko | H04L 63/08 |
| | | | | 726/3 |
| 2014/0337634 | A1* | 11/2014 | Starner | H04L 9/3231 |
| | | | | 713/186 |

FOREIGN PATENT DOCUMENTS

| | | |
|---|---|---|
| KR | 1020080096722 A | 11/2008 |
| KR | 10-2014-0121571 A | 10/2014 |

OTHER PUBLICATIONS

Korean Intellectual Patent Office, "Notice of Non-final Rejection," Application No. 10-2015-0186770, dated Nov. 14, 2016, 22 pages, publisher KIPO, Daejeon, Republic of Korea.

Foreign Communication from Related Counterpart Application; Korean Patent Application No. 1020080096722; Notice of Final Rejection dated Mar. 15, 2017; 6 pages.

Foreign Communication from Related Counterpart Application; Korean Patent Application No. 1020080096722; Notice of Final Rejection (Reexamination) dated May 8, 2017; 6 pages.

Extended European Search Report, dated Nov. 22, 2017, regarding European Patent Application No. 15877209.5, 8 pages.

Office Action, dated Feb. 8, 2018, regarding Korean Patent Application No. 10-02017-0070955, 4 pages.

Communication from a foreign patent office in a counterpart foreign application, "Notification of Reason for Refusal," Korean Application No. KR 10-2017-0070955, dated Aug. 14, 2017, 101 pages.

Communication pursuant to Article 94(3) EPC dated Jun. 6, 2018 in connection with European Patent Application No. 15 877 209.5.

* cited by examiner

METHOD AND APPARATUS FOR A WEARABLE BASED AUTHENTICATION FOR IMPROVED USER EXPERIENCE

TECHNICAL FIELD

The present application relates generally to user authentication and, more specifically, to a method and apparatus for using wearable devices to authenticate a user and provide improved user experience while interacting with digital devices and data.

BACKGROUND

When a user is authenticated (either via biometrics, password or other modality) the authentication is valid only on the authenticated device and the authentication is usually invalid after certain period of inactivity. It is a challenge to make the authentication persist for a longer duration without compromising security. Further, making the authentication persist across several devices and applications while maintaining security is not straight forward.

Mobile devices rely on the use of a single modality, such as fingerprint or iris, to perform biometric based user authentication. Such biometric systems suffer from a high false rejection and they require a user response such as swiping a finger.

A high false rejection rate could result from adjusting for low false acceptance rates. A false rejection is when a user who should be authenticated is denied. A false acceptance is when a user who should not be authenticated is accepted. Every biometric has a trade-off between false accepts and false rejects, achieving low equal error rates is difficult especially when errors due to failure-to-capture is taken into account. A high false reject rate corresponds to bad user experience.

The need for user to actively engage in the authentication process upon request leads to comparatively larger delays in user authentication and negatively impacts user experience. Users are less likely to adopt a biometric authentication solution if it requires substantially more effort.

SUMMARY

A first embodiment provides a wearable device is provided for authentication that includes a memory element and processing circuitry coupled to the memory element. The memory element configured to store a plurality of user profiles. The processing circuitry is configured to identify a pairing between the wearable device and a device. The processing circuitry is configured to identify a user of the wearable device. The processing circuitry also is configured to determine if the identified user matches a profile of the plurality of user profiles. The processing circuitry is also configured to responsive to the identified user matching the profile, determine if the profile provides authorization to access the device. The processing circuitry is also configured to responsive to the profile providing authorization to the device, send a message to the device authorizing access to the device.

A second embodiment provides a method is provided for authentication. The method includes identifying a pairing between the wearable device and a device. The method also includes identifying a user of the wearable device. The method also includes determining if the identified user matches a profile of the plurality of user profiles. The method also includes responsive to the identified user matching the profile, determining if the profile provides authorization to access the device. The method also includes responsive to the profile providing authorization to the device, sending a message to the device authorizing access to the device.

A third embodiment provides a wearable device in conjunction with another device for authentication that includes a memory element and processing circuitry coupled to the memory element. The memory element on the non-wearable device is configured to store a plurality of user profiles. The processing circuitry on the non-wearable device is configured to identify a pairing between the wearable device and a device. The processing circuitry is configured to identify a user of the wearable device. The processing circuitry also is configured to determine if the identified user matches a profile of the plurality of user profiles. The processing circuitry is also configured to responsive to the identified user matching the profile, determine if the profile provides authorization to access the device. The processing circuitry is also configured to receive periodic requests from the device to verify that the authorization is still valid.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

Figure 1:
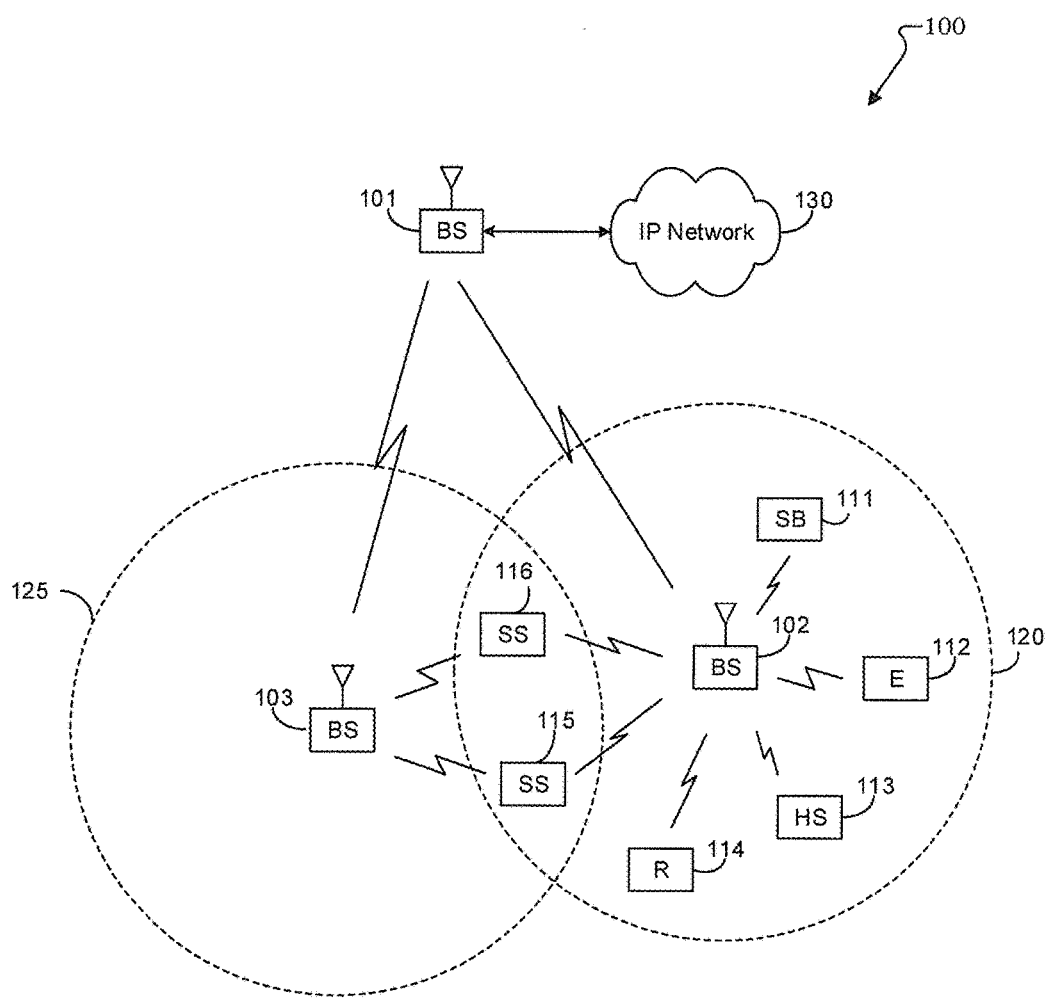
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, Bluetooth, NFC or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
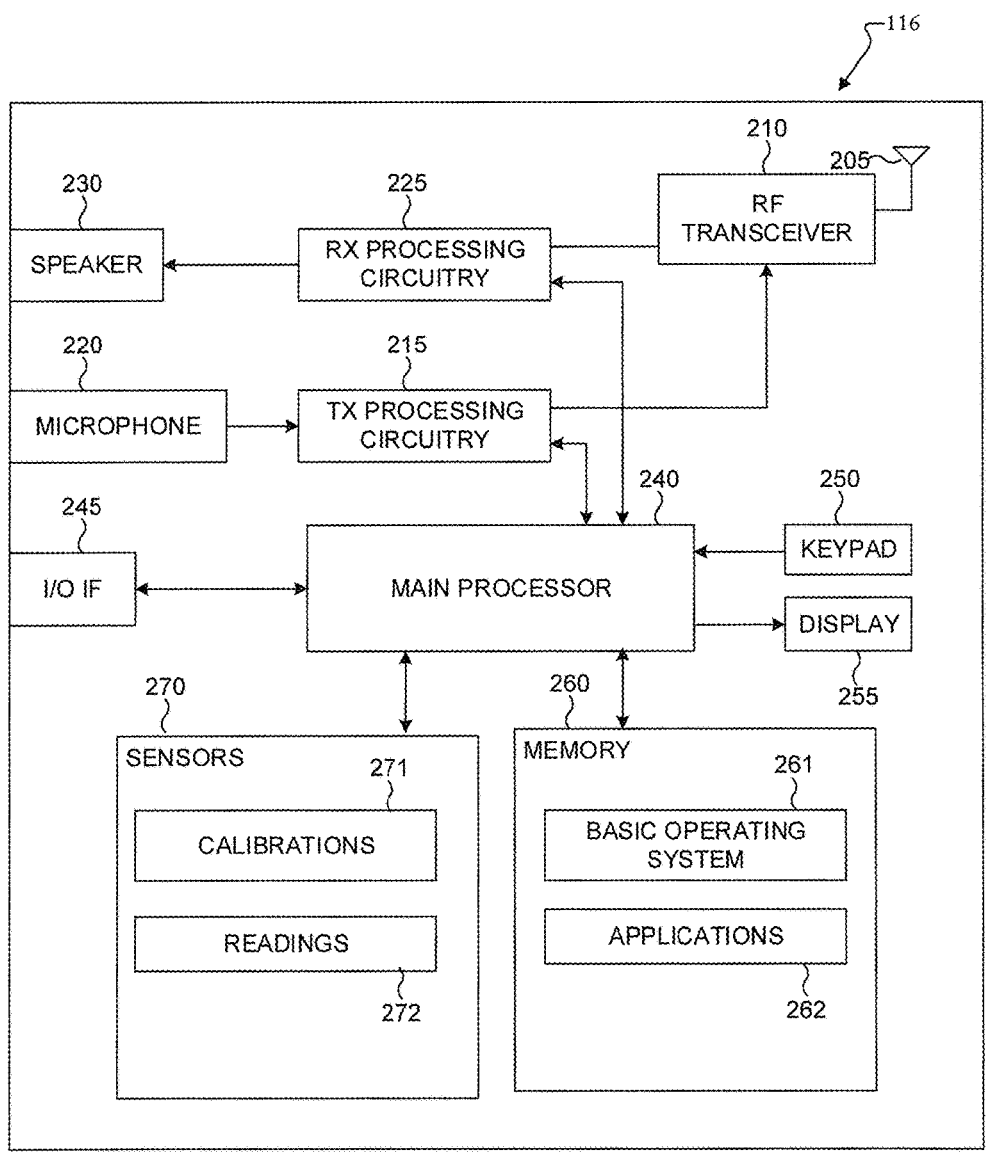
FIG. 2 illustrates an example UE according to this disclosure.

FIG. 2 illustrates an example UE 116 according to this disclosure. The embodiment of the UE 116 illustrated in FIG. 2 is for illustration only, and the UEs 111-115 of FIG. 1 could have the same or similar configuration. However, UEs come in a wide variety of configurations, and FIG. 2 does not limit the scope of this disclosure to any particular implementation of a UE.

As shown in FIG. 2, the UE 116 includes an antenna 205, a radio frequency (RF) transceiver 210, transmit (TX) processing circuitry 215, a microphone 220, and receive (RX) processing circuitry 225. The UE 116 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and execute the basic OS program 261 stored in the memory 260 in order to control the overall operation of the UE 116. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs or an operator. The main processor 240 is also coupled to the I/O interface 245, which provides the UE 116 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 116 can use the keypad 250 to enter data into the UE 116. The display 255 may be a liquid crystal display or other display capable of rendering text and/or at least limited graphics, such as from web sites.

The memory 260 is coupled to the main processor 240. Part of the memory 260 could include a random access memory (RAM), and another part of the memory 260 could include a Flash memory or other read-only memory (ROM).

The sensors 270 are also coupled to the main processor 240. The sensors 270 can detect events or changes in quantities and provide a corresponding output. For example, sensors 270 can include gyroscope, accelerometer, proximity sensor, ambient light sensor, magnetometer, location sensors, and the like. In some embodiments, the sensors 270 are configured with calibrations 271. The calibrations 271 allow for a baseline to measure changes against and can be adjusted. The sensors 270 can also obtain readings 272. The readings can be changes between a measurement and the baseline calibration. The readings 272 can be stored in memory 260 as well as other storage devices.

Although FIG. 2 illustrates one example of UE 116, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 116 configured as a mobile telephone or smartphone, UEs could be configured to operate as other types of mobile or stationary devices.

Various embodiments of this disclosure recognize and take into account that current biometric modalities are not in a wearable form factor. For example, fingerprint based authentication either uses a separate fingerprint scanning device or a mobile device with integrated fingerprint scanner.

Various embodiments of this disclosure recognize and take into account that there are wearable biometrics such as wristbands that are EKG based authentication devices and iris recognition watches, but both of these devices need user action. Also these devices suffer from "failure to capture," which refers to a capture of low-fidelity data from a sensor front-end that makes it difficult to authenticate.

Various embodiments of this disclosure recognize and take into account that there have been cameras used to detect a person's gait but these systems are not in the wearable form-factor and are not always in the user's immediate vicinity. There are also user behavior based methods such as keystroke dynamics that cannot be used with devices that do not have keyboards or touchscreens. Neither are these in a wearable form factor.

One or more embodiments of this disclosure provide using multiple biometric modalities to solve high false rejections; each of which is tuned for very low false rejects. The multiple modalities could then be combined to provide both low false rejects and low false accepts. The multiple modalities could be behavioral, bio-dynamics, and other biometric methods. Some examples for these modalities are accelerometer based motion signature, skin type, variation of heart-rate with activity, social and device interaction patterns, body composition, metabolism based markers, and the like. In an example embodiment, the biometric modalities do not need active user input/action. A one-time authentication requiring active user input can be used.

Figure 3:
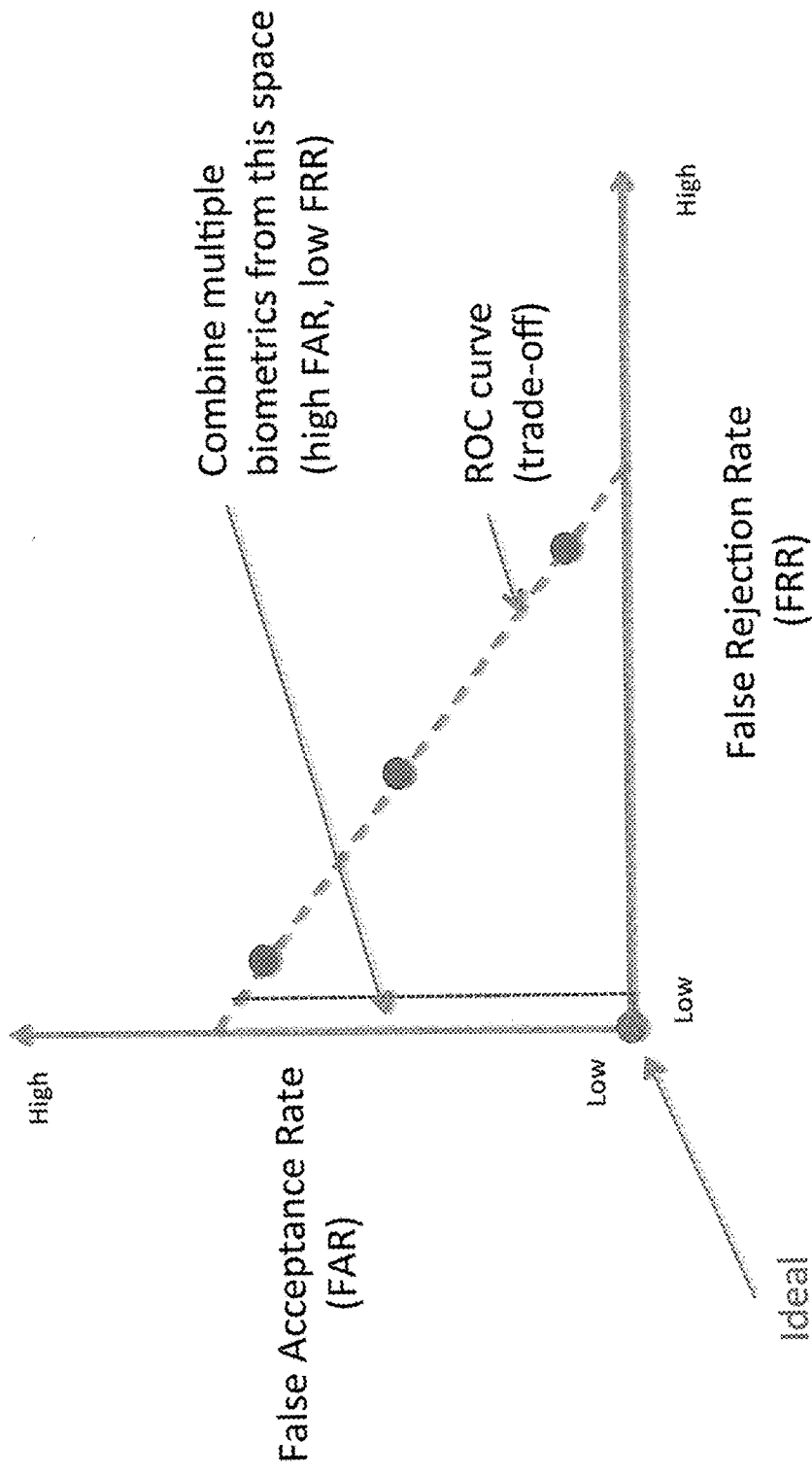
FIG. 3 illustrates a receiver operating curve of a biometric authentication modality.

FIG. 3 illustrates a receiver operating curve of a biometric authentication modality. Every biometric verification modality has a trade-off between false accepts (imposter being wrongly authenticated) versus false rejects (user being wrongly rejected). In FIG. 3, an example of this trade-off is captured in the ROC curve.

Figure 4:
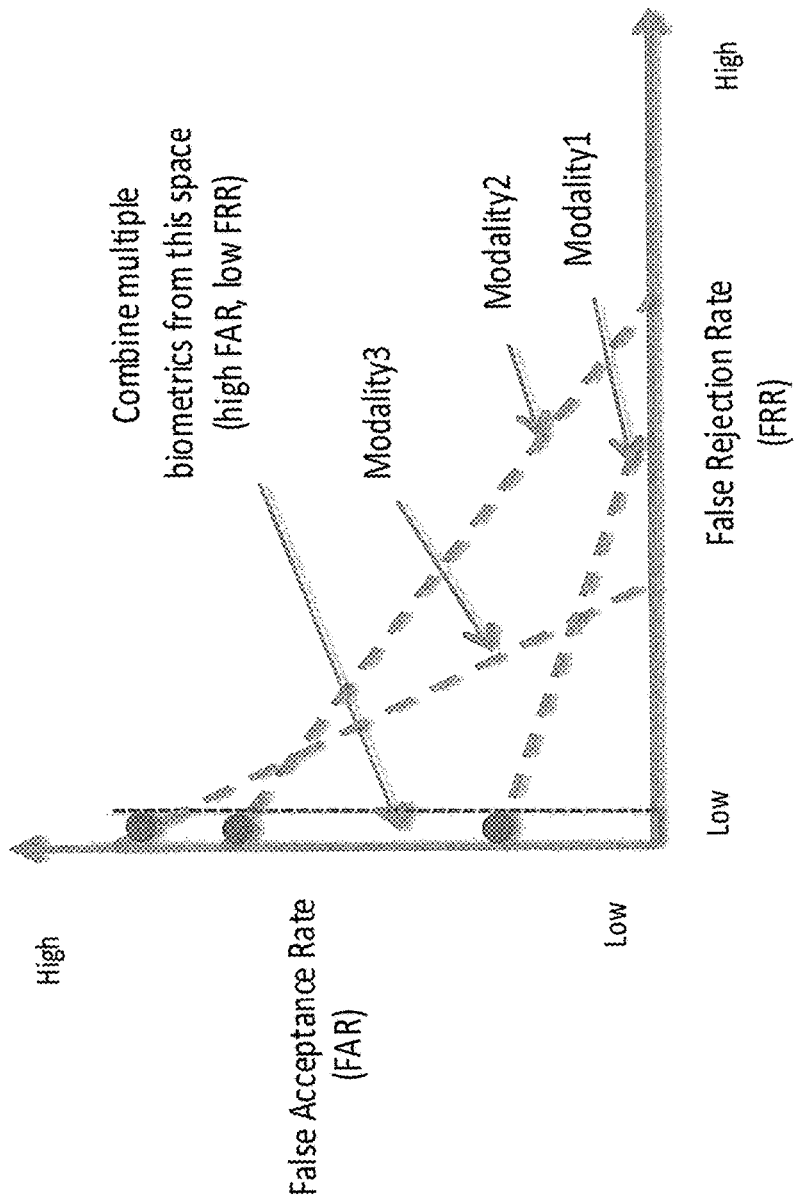
FIG. 4 illustrates receiver operating curves of combined biometric authentication modality in accordance with an embodiment of this disclosure.

FIG. 4 illustrates receiver operating curves of combined biometric authentication modality in accordance with an embodiment of this disclosure. The embodiment of the receiver operating curves illustrated in FIG. 4 is for illustration only. However, receiver operating curves come in a wide variety of configurations, and FIG. 4 does not limit the scope of this disclosure to any particular implementation of receiver operating curves.

Figure 5:
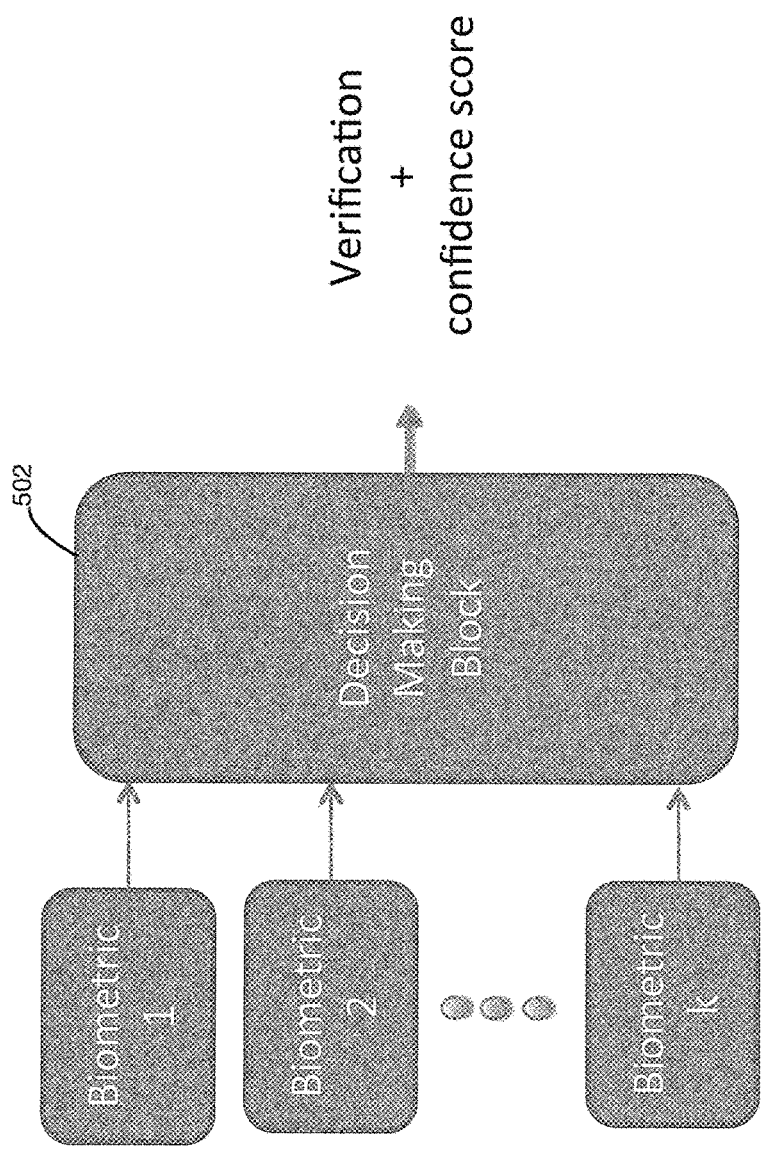
FIG. 5 illustrates a parallel mode in accordance with an embodiment of this disclosure.

FIG. 5 illustrates a parallel mode in accordance with an embodiment of this disclosure. The embodiment of the receiver operating curves illustrated in FIG. 5 is for illustration only. However, a parallel mode come in a wide variety of configurations, and FIG. 5 does not limit the scope of this disclosure to any particular implementation of a parallel mode.

In FIG. 5, different modalities are processed simultaneously. The individual decisions and confidence in those results are combined to provide an overall decision (i.e. accept or reject) along with overall confidence in that decision. Further, individual decisions can be selectively combined to provide results with differing confidence scores. In one example of the embodiment, instead of combining individual decisions, data from different modalities can be used to make a single decision.

Figure 6:
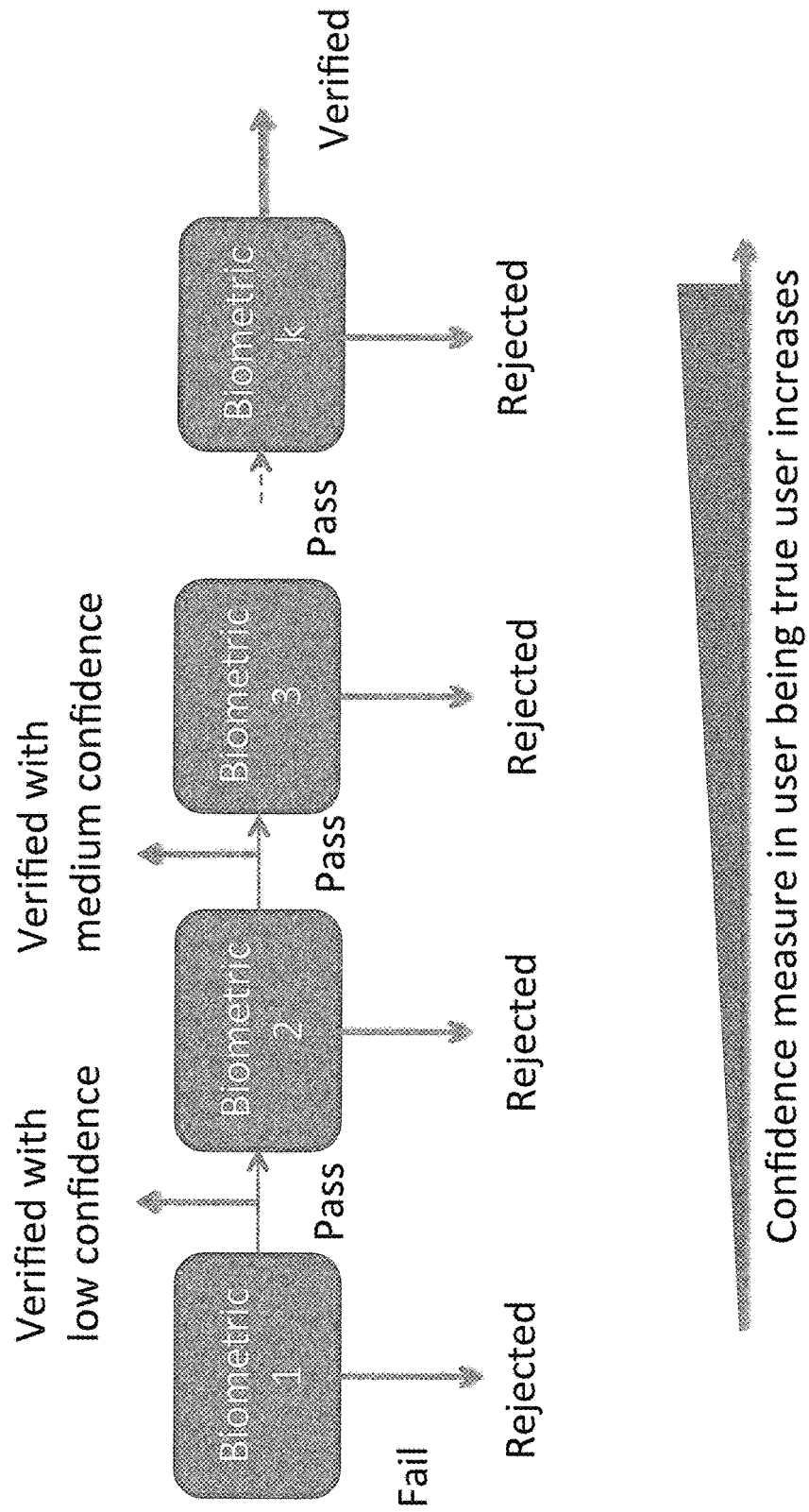
FIG. 6 illustrates a cascade mode in accordance with an embodiment of this disclosure.

FIG. 6 illustrates a cascade mode in accordance with an embodiment of this disclosure. The embodiment of the receiver operating curves illustrated in FIG. 6 is for illustration only. However, a cascade mode come in a wide variety of configurations, and FIG. 6 does not limit the scope of this disclosure to any particular implementation of a cascade mode.

In FIG. 6, different modalities are evaluated in a cascade structure. Intermediate results with confidence scores are made available at various stages of the cascade. In one example implementation of the cascade structure, the current modality is trained specifically on examples (i.e. subjects) that get through the preceding modality in addition to new examples to better tune the current modality. Current modality does not have to deal with examples that fail the preceding modality thereby making the space of possibilities slightly smaller.

In yet another example implementation of the cascade structure the particular order of the cascade is customized to the data of the user. For example, for user A, biometric 1 can be gait and biometric 2 can be voice, and for user B, biometric 1 can be skin type and biometric 2 can be gait.

One or more embodiments can include non-biometric modalities for user authentication such as passwords, other user specific information, and the like.

An embodiment of this disclosure is based on the on-demand data collection and on-demand data processing. When user makes a request that requires authentication, data is collected from a wearable device, and processed to identify the user.

Another embodiment of this disclosure is based on the continuous data collection and on-demand data processing. Data is collected from the wearable or other sensors continuously and either processed into an intermediate format or stored raw in a data buffer. When user makes a request that requires authentication, the collected data is processed to identify the user.

Yet another embodiment of this disclosure is based on the continuous data collection and continuous data processing. Data is collected from the wearable or other sensors continuously, and processed as soon as enough data is available. When user makes a request that requires authentication, the system verifies whether the last authentication attempt has been successful or not.

Yet another embodiment of this disclosure is based on the initial authentication when user wears the wearable device and after initial authentication tracking the change in authentication state using sensor, mechanical design, or external inputs. One time authentication confirms user identity, and switches the device into an authenticated state and from that point, the system tracks whether the authentication still holds. In the example of a watch form factor, the verification can be done by checking if the person has taken the watch off after the initial authentication. Among other solutions, this can be done via skin conductance or optical sensors, or a mechanical method of detecting the device is off.

Figure 7:
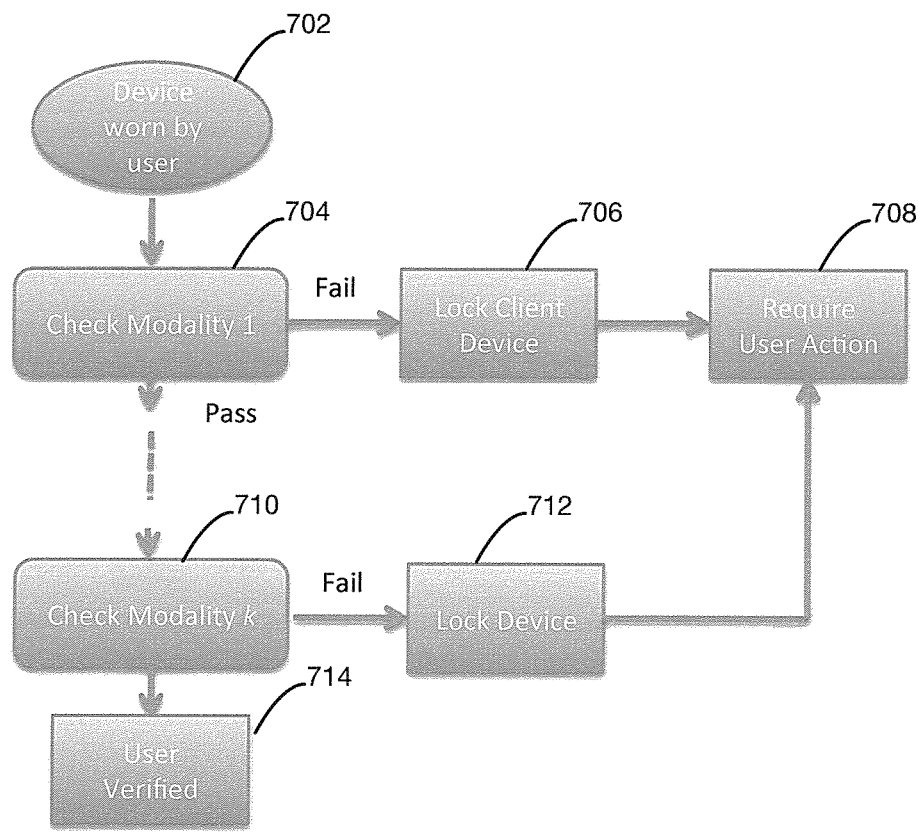
FIG. 7 illustrates a process for a cascade mode without varying confidence verification in accordance with an embodiment of this disclosure.

FIG. 7 illustrates a process for a cascade mode without varying confidence verification in accordance with an embodiment of this disclosure. The controller here may represent the main processor 240 and the memory element may be the memory 260 in FIG. 2. The embodiment of the process shown in FIG. 7 is for illustration only. Other embodiments of the process could be used without departing from the scope of this disclosure.

At operation 702, the controller determines that a user wears the device. The device could be any type of wearable device and may be worn by the user in many different methods.

At operation 704, the controller checks a first modality. If the first modality fails, at operation 706, the client device is locked. The client device can be another mobile device. The controller may transmit a message to the client device to lock. Once the client device is locked, at operation 708, the controller requests user action to verify the user and unlock the client device.

At operation 710, another modality is checked. If the other modality fails, at operation 712, the client device is locked and user action is requested at operation 708. If at operations 704 and 710, the modalities pass, at operation 714, the user is verified.

In FIG. 7, operations 704 and 710 are performed in sequence. In other example embodiments, operations 704 and 710 can be performed in parallel. As used herein, checking a modality can be defined as monitoring a biometric.

Figure 8:
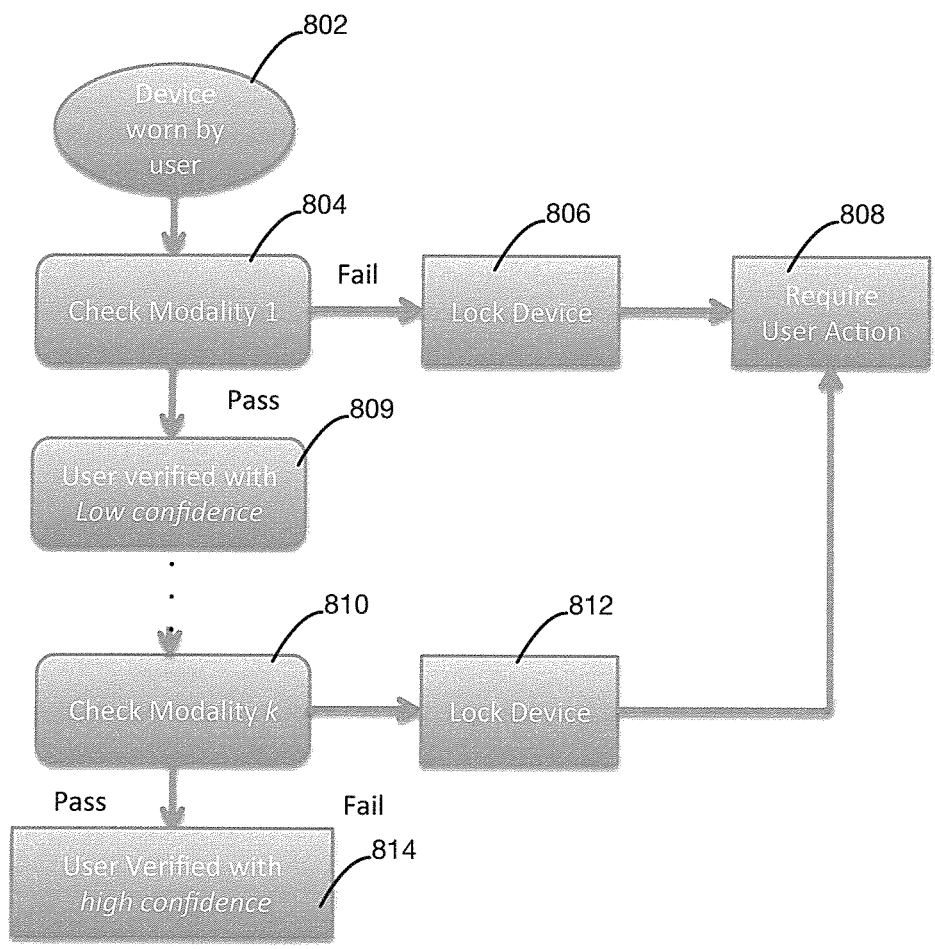
FIG. 8 illustrates a process for a cascade mode in accordance with an embodiment of this disclosure.

FIG. 8 illustrates a process for a cascade mode in accordance with an embodiment of this disclosure. The controller here may represent the main processor 240 and the memory element may be the memory 260 in FIG. 2. The embodiment of the process shown in FIG. 8 is for illustration only. Other embodiments of the process could be used without departing from the scope of this disclosure.

At operation 802, the controller determines that a user wears the device. The device could be any type of wearable device and may be worn by the user in many different methods.

At operation 804, the controller checks a first modality. If the first modality fails, at operation 806, the client device is locked. The client device can be another mobile device. The controller may transmit a message to the client device to lock. Once the client device is locked, at operation 808, the controller requests user action to verify the user and unlock the client device.

At operation 804, if the first modality passes, then at operation 809, the user is verified with a low confidence. A low confidence can be defined as a low confidence that the user has permission to access the client device. A high confidence can be defined as a higher confidence than the lower confidence that the user has permission to access the client device.

At operation 810, the next modality is checked. If the next modality fails, at operation 812, the client device is locked and user action is requested at operation 808. If at operation 810, the next modality passes, at operation 814, the user is verified with high confidence.

Figure 9:
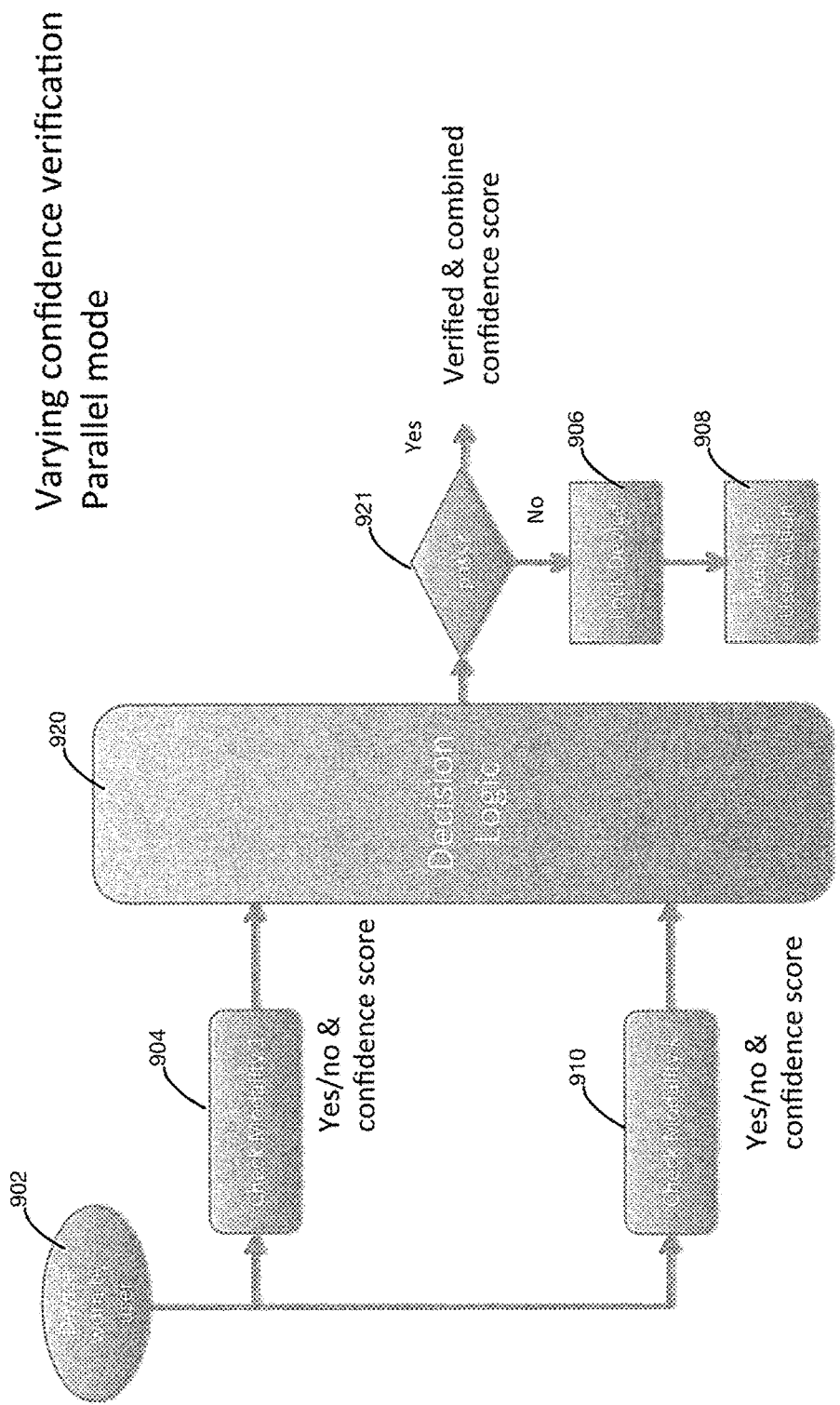
FIG. 9 illustrates a process for varying confidence verification in parallel mode in accordance with an embodiment of this disclosure.

FIG. 9 illustrates a process for varying confidence verification in parallel mode in accordance with an embodiment of this disclosure. A controller here may represent the main processor 240 and a memory element may be the memory 260 in FIG. 2. The embodiment of the process shown in FIG. 9 is for illustration only. Other embodiments of the process could be used without departing from the scope of this disclosure.

At operation 902, the controller determines that a user wears the device. The device could be any type of wearable device and may be worn by the user in many different methods.

At operation 904 and 910, the controller checks the modalities. The operations 904 and 910 can be performed at different or the same times. At operation 920, a decision logic controlled by the processor receives pass or fails (yes or no) from operations 904 and 910. Operations 904 and 910 can also provide confidence scores. As used herein, confidence or confidence scores may be defined as the determined by how close the values of the modalities are to an ideal or registered modality and also the inherent false positive of that modality. Also, as used herein, modality can be referred to as a biometric.

At operation 921, the controller determines whether the decision logic passed or failed the user using the combined confidence score. In response to passing, the controller verifies the user. In response to failing, at operation 906, the controller transmits a signal to the client device to lock the client device. At operation 908, the controller requires and/or requests a user action to unlock the client device. Herein, the user action can be entering a password, a fingerprint scan, and the like.

Various embodiments of this disclosure recognize and take into account that with electronic devices, for example tablets or computers, being shared between multiple people there is none or very little (i) separation of user preferences, and (ii) protection of user-specific sensitive information.

In one or more embodiments, as used herein, a primary device can be any electronic device that runs secure applications and may require authentication, for example a mobile device or a personal computer. User-specific sensitive information may include documents, installed applications/programs, settings, preferences, history for applications and programs, and the like.

One or more embodiments of this disclosure provide using multi-modal biometrics and other sensor info as proxy for user authentication credentials. A wearable device (in conjunction with other info) uniquely identifies the user based on the user, the primary device (for example, tablet) is configured to fit the user profile, which enables access to the user specific sensitive information.

One or more embodiments of this disclosure provide a method and apparatus to perform multi-modal user identification, use of wearable device to identify user, use of wearable device in conjunction with other info to identify the user, and temporarily pairing a primary device to a user, which enables seamless access to the user-specific sensitive information (as long as the pairing persists).

Figure 10:
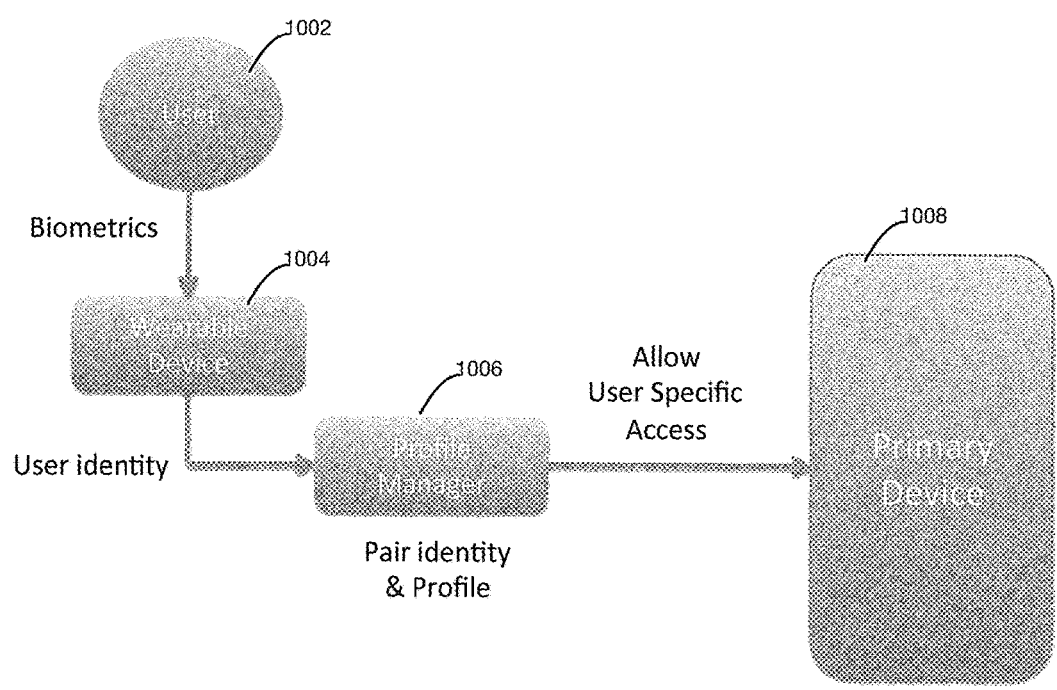
FIG. 10 illustrates block diagram of system of a wearable device in accordance with an embodiment of this disclosure.

FIG. 10 illustrates block diagram of system of a wearable device in accordance with an embodiment of this disclosure. The embodiment of the system of a wearable device illustrated in FIG. 10 is for illustration only. However, systems come in a wide variety of configurations, and FIG. 10 does not limit the scope of this disclosure to any particular implementation of the system. The devices in FIG. 10 can be controlled by a controller and/or processor such as main processor 240 as shown in FIG. 2.

In an embodiment of this disclosure, the system includes user 1002. The user can be someone who has access to primary device 1008. Wearable device 1004 monitors the biometrics for user 1002. Wearable device 1004 can identify a user and send the identity of the user to profile manager 1006. Profile manager 1006 can pair the identity of the user to a user profile. The profile can include user-specific sensitive information. The profile manager 1006 can reside on the wearable device 1006 or primary device 1008. The primary device (or client device) 1008 can receive the profile and allow user specific access.

Figure 11:
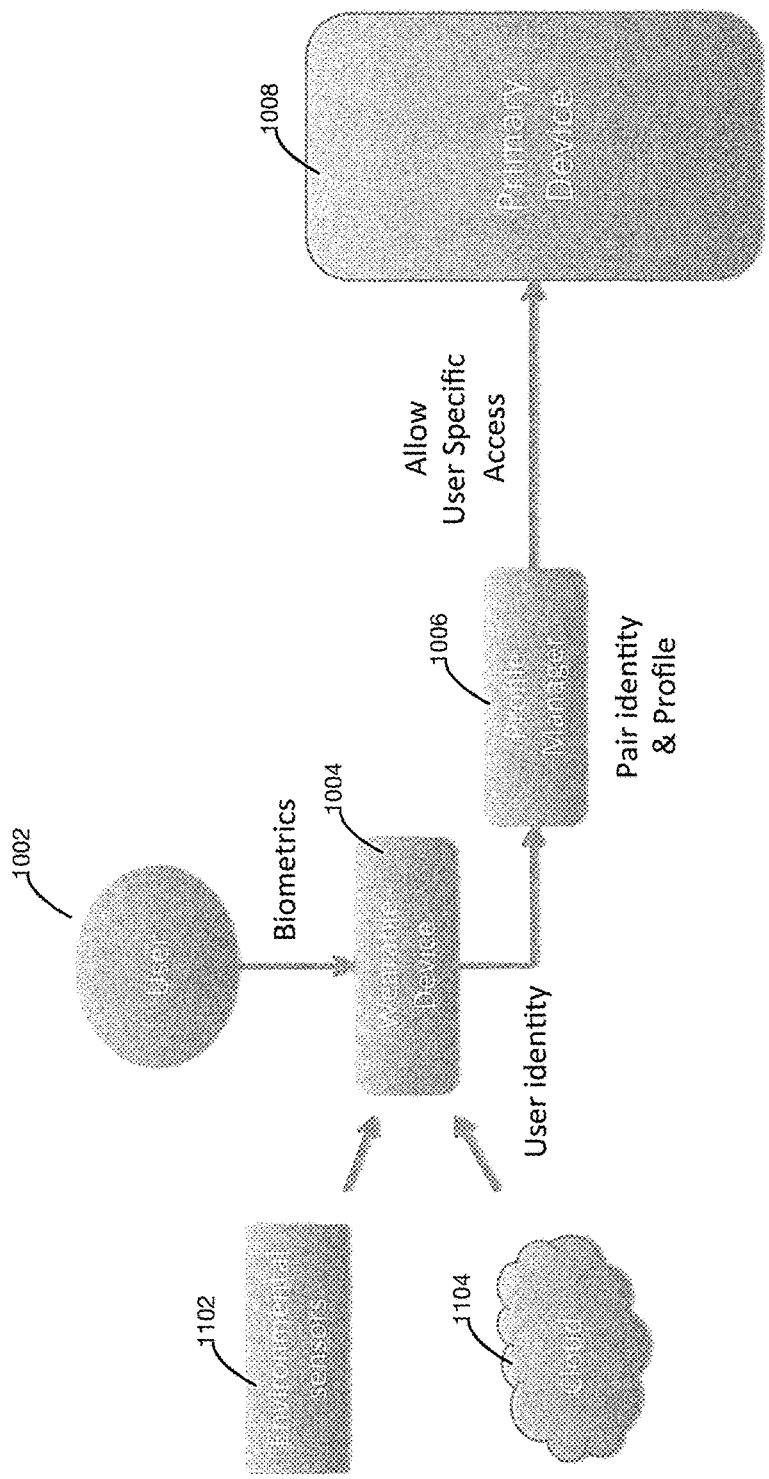
FIG. 11 illustrates block diagram of system of a wearable device with environmental sensors in accordance with an embodiment of this disclosure.

FIG. 11 illustrates block diagram of system of a wearable device with environmental sensors in accordance with an embodiment of this disclosure. The embodiment of the system of a wearable device illustrated in FIG. 11 is for illustration only. However, systems come in a wide variety of configurations, and FIG. 11 does not limit the scope of this disclosure to any particular implementation of the system. The devices in FIG. 11 can be controlled by a controller and/or processor such as main processor 240 as shown in FIG. 2.

In an embodiment of this disclosure, the system is similar to the system of FIG. 10. This system also includes environmental sensors 1102 and a cloud 1104. Wearable device 1004 can use information received about the environment from the environmental sensors 1102 and/or received from the cloud from cloud 1104 along with the biometrics in determining a user identity.

Figure 12:
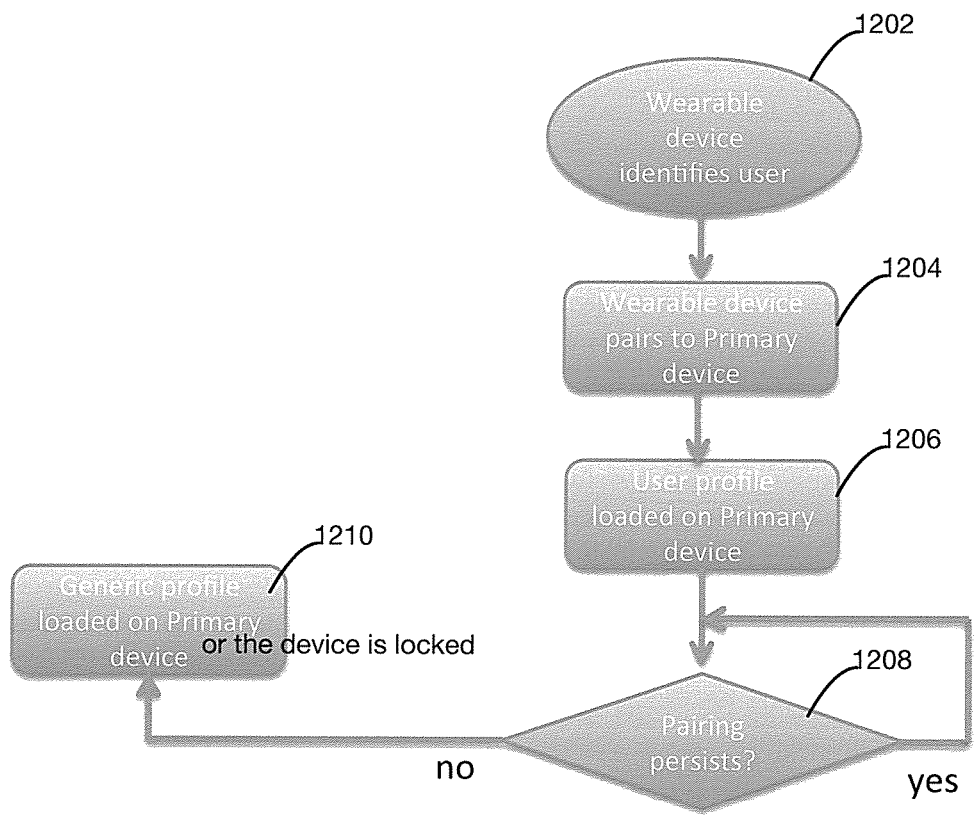
FIG. 12 illustrates a process for pairing in accordance with an embodiment of this disclosure.

FIG. 12 illustrates a process for pairing in accordance with an embodiment of this disclosure. A controller here may represent the main processor 240 and a memory element may be the memory 260 in FIG. 2. The embodiment of the process shown in FIG. 12 is for illustration only. Other embodiments of the process could be used without departing from the scope of this disclosure.

At operation 1202, a controller of the wearable device identifies a user. The user can be identified using any of the techniques herein. At operation 1204, the wearable device pairs to the primary device (or client device). At operation 1206, a user profile is loaded or transmitted to the primary device. At operation 1208, the controller monitors the pairing to determine whether it persists. Once the pairing has been terminated or lost, at operation 1210, a generic profile is loaded onto the primary device or the device could be locked. A generic profile can lose access to user-specific sensitive information. During operating 1208, the wearable device, the primary device, or a combination of both may monitor the pairing status.

Various embodiments take into account and recognize that due to the device and user mobility, current methods of authentication may not verify the authentication validity past the actual authentication time. This results in very short time outs and frequent requests for re-authentication. Truly seamless authentication requires a method for continuous re-authentication or verification of the authentication validity without an active user input.

Figure 13:
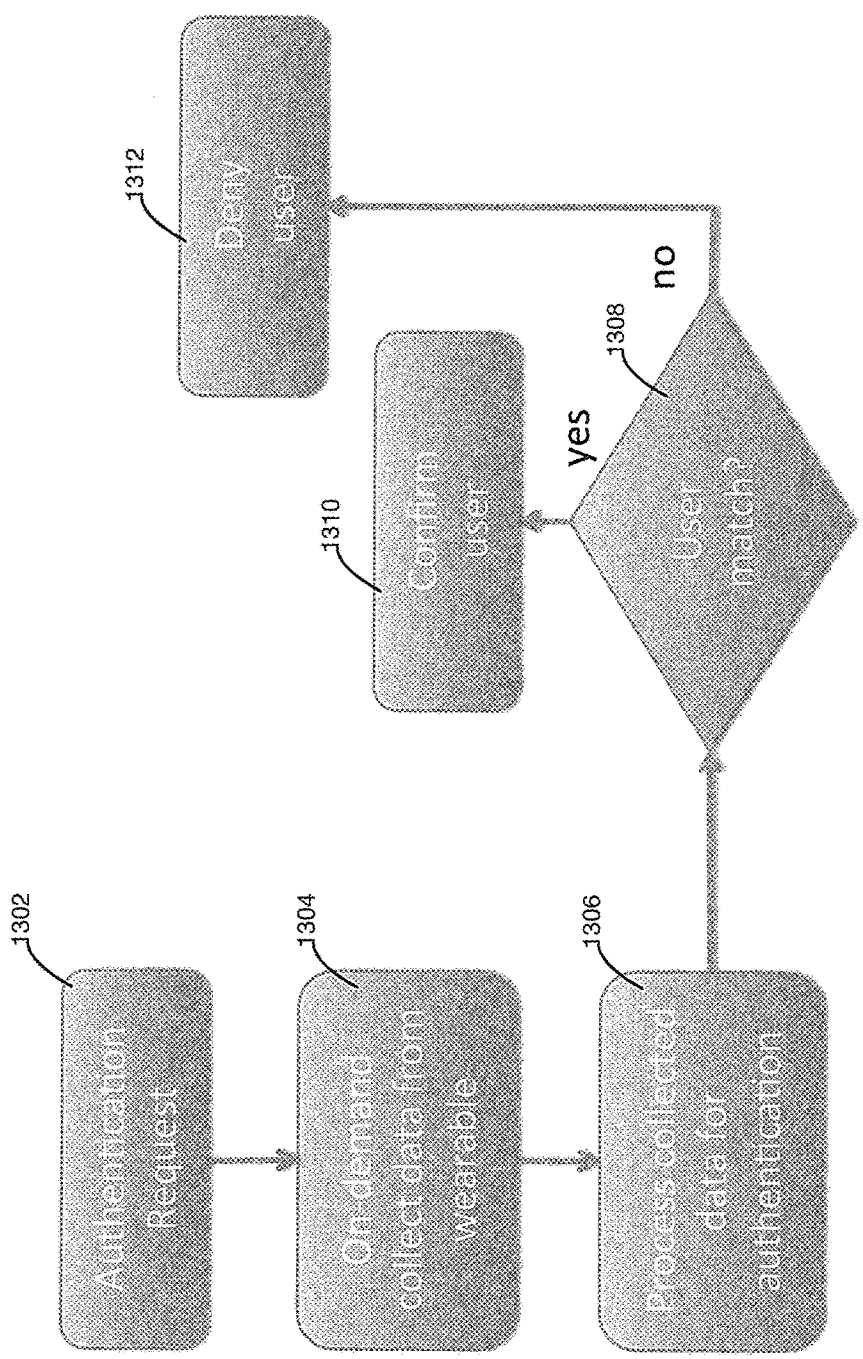
FIG. 13 illustrates a process for on demand authentication with on demand sensing in accordance with an embodiment of this disclosure.

FIG. 13 illustrates a process for on demand authentication with on demand sensing in accordance with an embodiment of this disclosure. A controller here may represent the main processor 240 and a memory element may be the memory 260 in FIG. 2. The embodiment of the process shown in FIG. 13 is for illustration only. Other embodiments of the process could be used without departing from the scope of this disclosure.

One or more embodiments of this disclosure provide on demand authentication with on demand sensing. In this embodiment, only a short window of data is required. In other words, the data for an effective authentication can be collected quickly. The authentication process is short and can be performed quickly without user input.

At operation 1302, when user makes an authentication request, at operation 1204, sensor data is collected on demand. At operation 1206, the collected data is then processed to make an authentication decision. At operation 1308, the controller determines whether there is a user match. If there is a user match, at operation 1310, the controller confirms the user. If there is not a match, at operation 1312, the controller denies the user.

Data collected on demand can be, but not limited, to biometric, wearable sensors, and other sensors. Processing may include, but not limited to, processing data from a single data modality and processing data from multiple modalities.

Figure 14:
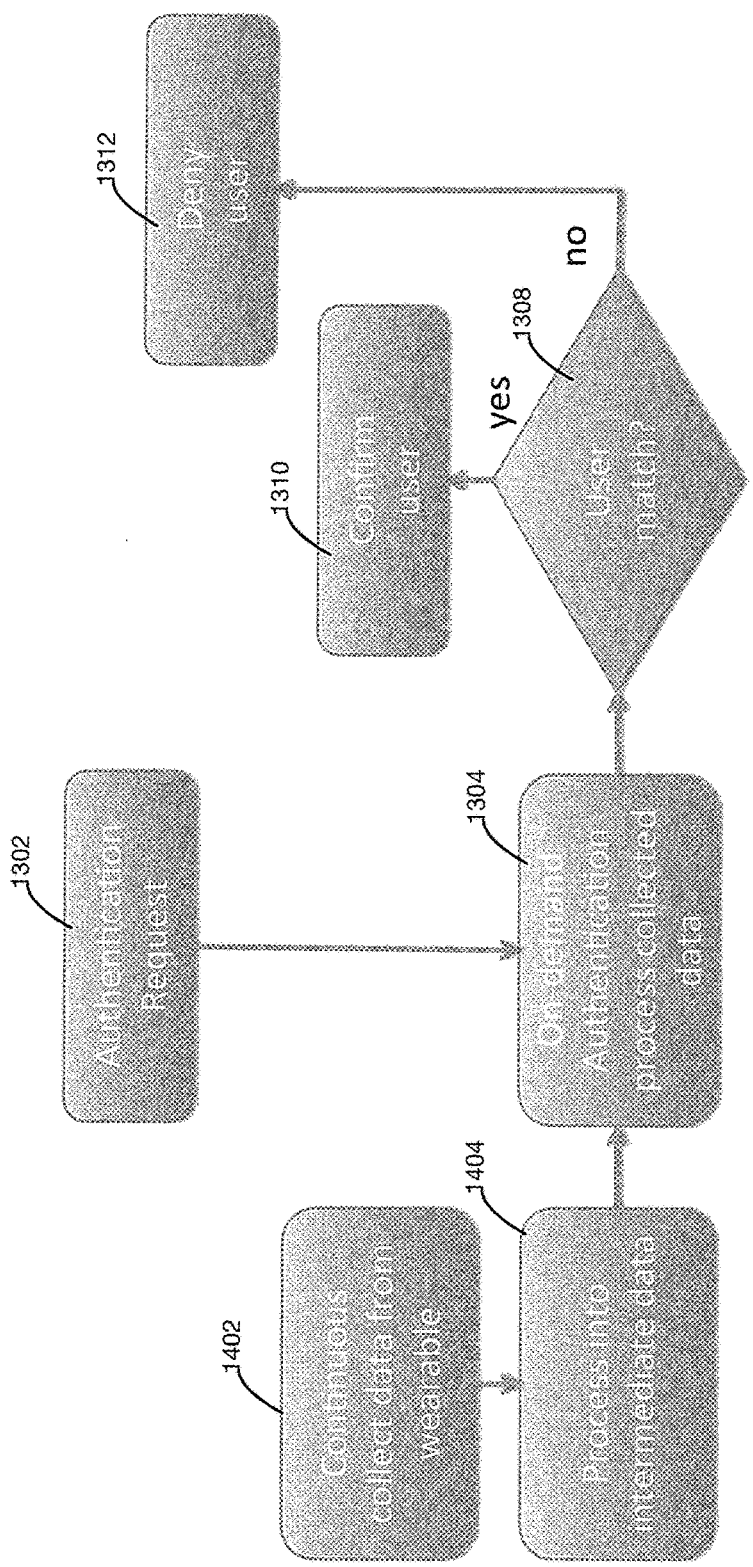
FIG. 14 illustrates a process for on demand authentication with continuous sensing in accordance with an embodiment of this disclosure.

FIG. 14 illustrates a process for on demand authentication with continuous sensing in accordance with an embodiment of this disclosure. A controller here may represent the main processor 240 and a memory element may be the memory 260 in FIG. 2. The embodiment of the process shown in FIG.

14 is for illustration only. Other embodiments of the process could be used without departing from the scope of this disclosure.

An embodiment of this disclosure provides a process during long window of data or when data collection is takes a while, meaning that data may not be collected on demand and the data is to be collected (or continuously since it is unknown when an authentication request will be made). The authentication process is short and can be performed quickly without user input.

At operation 1302, when user makes an authentication request, at operation 1204, sensor data is collected on demand. At operation 1308, the controller determines whether there is a user match. If there is a user match, at operation 1310, the controller confirms the user. If there is not a match, at operation 1312, the controller denies the user.

At operation 1402, sensor data is collected continuously. The sensor data is either stored raw in a data buffer, or is processed into intermediate data, at operation 1404, and stored into a data buffer. When user makes an authentication request, the stored data is processed to make an authentication decision.

An embodiment of this disclosure provides that some data may be collected on demand, while other data may be collected continuously. Data collected can be, but not limited to, biometric, wearable sensors, and other sensors. The continuously collected data can be stored raw, or stored as a result of intermediate processing that is done continuously. Processing may include processing data from a single data modality and processing data from multiple modalities.

Figure 15:
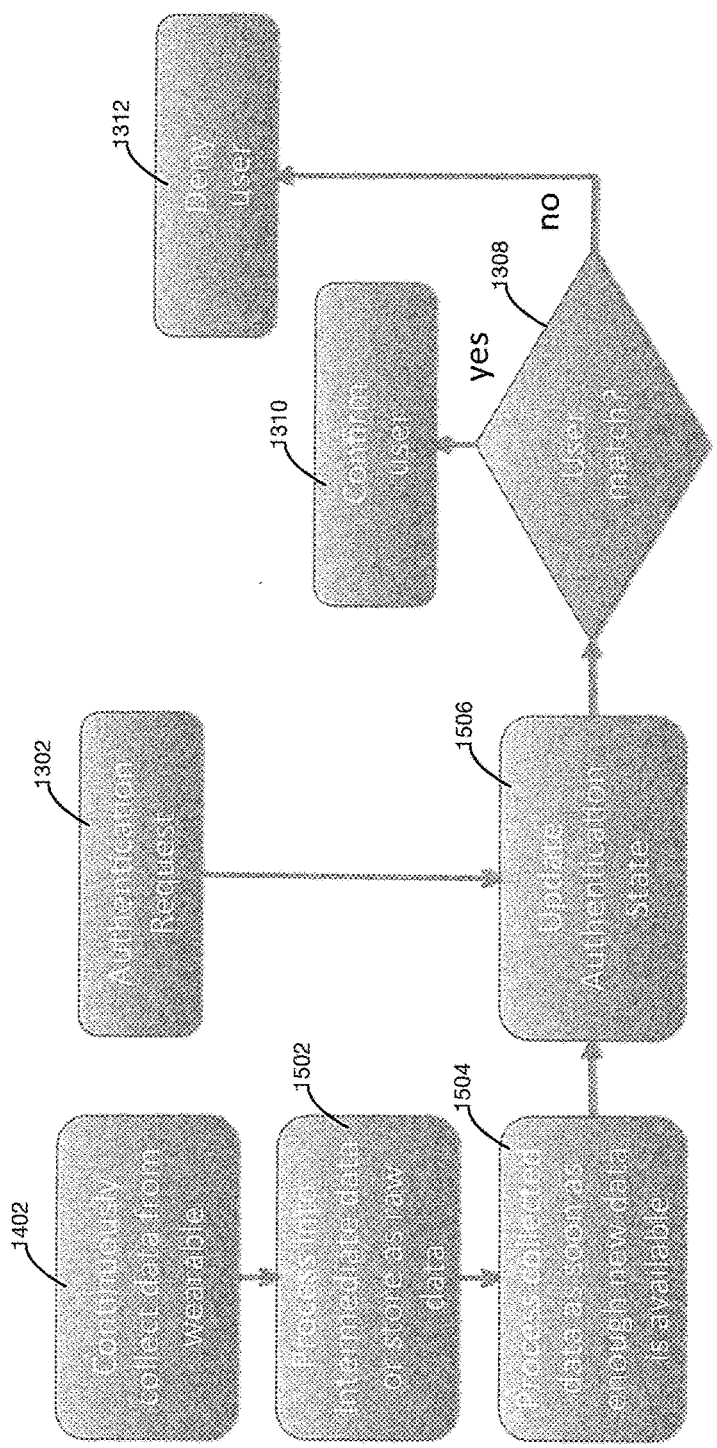
FIG. 15 illustrates a process for continuous authentication with continuous sensing in accordance with an embodiment of this disclosure.

FIG. 15 illustrates a process for continuous authentication with continuous sensing in accordance with an embodiment of this disclosure. A controller here may represent the main processor 240 and a memory element may be the memory 260 in FIG. 2. The embodiment of the process shown in FIG. 15 is for illustration only. Other embodiments of the process could be used without departing from the scope of this disclosure.

An embodiment provides for data to be collected on a continuous basis. The authentication process is executed continuously as enough data becomes available.

At operation 1302, when user makes an authentication request, at operation 1506, the controller updates the authentication state. At operation 1308, the controller determines whether there is a user match. If there is a user match, at operation 1310, the controller confirms the user. If there is not a match, at operation 1312, the controller denies the user.

At operation 1402, sensor data is collected continuously. The sensor data is either stored raw in a data buffer, or is processed into intermediate data, at operation 1502, and stored into a data buffer. When enough data is available, at operation 1504, the stored data is processed to make an authentication decision. When user makes an authentication request, the system verifies whether it is still authenticated (based on the continuous processing).

An embodiment of this disclosure provides that some data may be collected on demand, while other data may be collected continuously. Data collected can be, but not limited to, biometric, wearable sensors, and other sensors. The continuously collected data can be stored raw, or stored as a result of intermediate processing that is done continuously. Processing may include processing data from a single data modality and processing data from multiple modalities.

Figure 16:
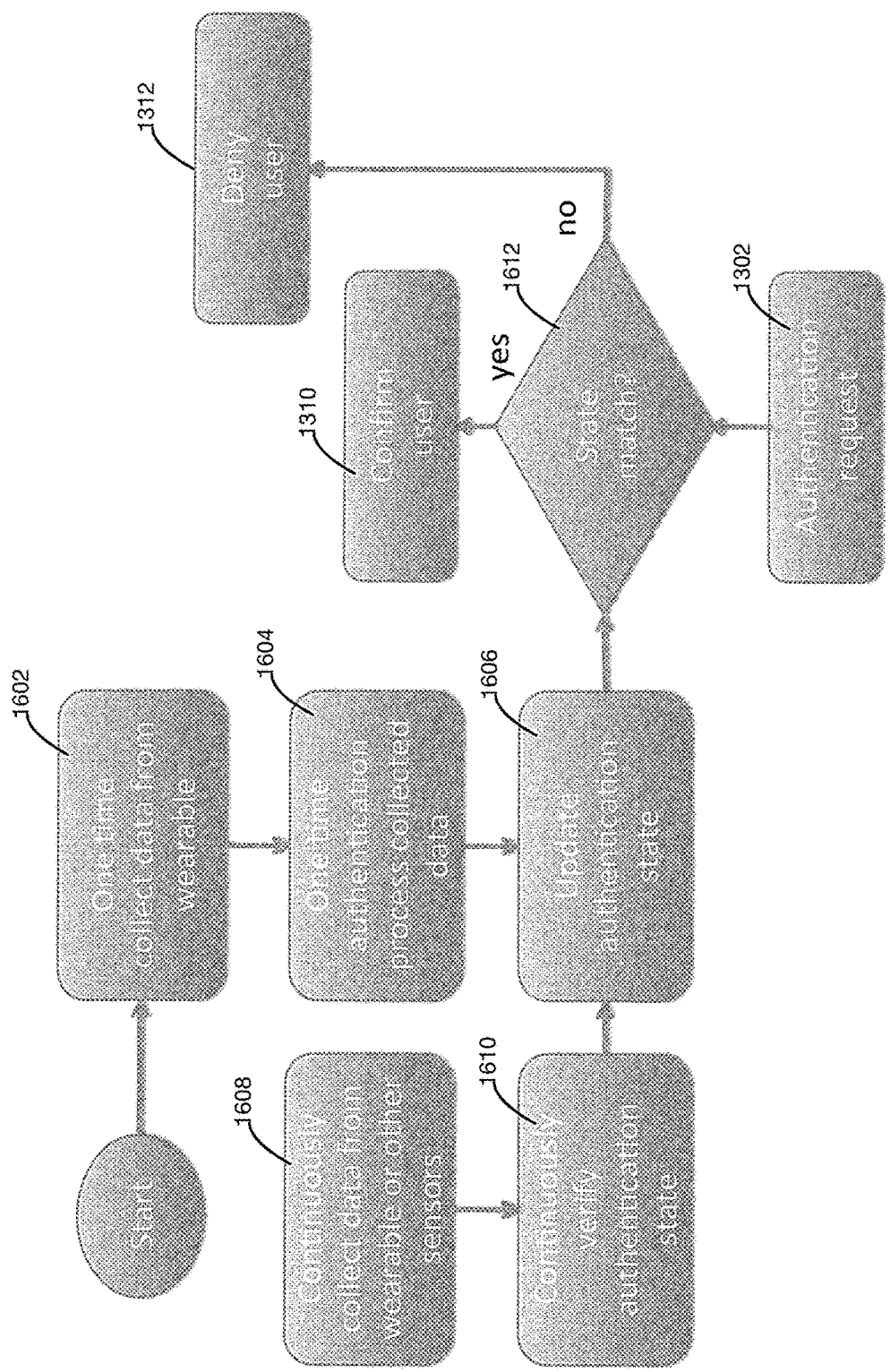
FIG. 16 illustrates a process for a one time authentication, followed by monitoring authentication state in accordance with an embodiment of this disclosure.

FIG. 16 illustrates a process for a one time authentication, followed by monitoring authentication state in accordance with an embodiment of this disclosure. A controller here may represent the main processor 240 and a memory element may be the memory 260 in FIG. 2. The embodiment of the process shown in FIG. 16 is for illustration only. Other embodiments of the process could be used without departing from the scope of this disclosure.

An embodiment provides that if there are clear conditions that indicate change from authenticated state to non-authenticated state, and these conditions can be observed by wearable or other sensors, or by other means.

At operation 1602, a user is pre-authenticated and one time data is collected from the wearable device. At operation 1604, the system enters authenticated state using the one time data. At operation 1608, the controller collects data from wearable or other sensors or user other information to, at operation 1610, verify if the conditions invalidating authenticated state have been met.

At operation 1302, when user makes an authentication request, at operation 1506, the controller updates the authentication state. At operation 1606, the authentication state is updated. At operation 1612, the controller determines whether there is a state match. When user makes an authentication request, the system verifies whether it is still in the authenticated state.

If there is a state match, at operation 1310, the controller confirms the user. If there is not a match, at operation 1312, the controller denies the user.

In this embodiment, the initial authentication is performed on demand including but not limited to biometrics, password verification, wearables, and the like. Sensors used for the initial authentication may or may not be the same as sensors used for the verification of the state. The data used for the verification of the state may include, but is not limited to, optical sensors to see if skin is continuously detected and the wearable has not been taken off, skin conductance sensor to see if skin is continuously detected and the wearable has not been taken off, and to monitor changes in the mechanical setup of the wearable to verify if the conditions invalidating authenticated state have been met. Monitoring changes in mechanical setup may be but is not limited to, in case of a watch form factor wearable, a circuit in a watch strap to see if the watch strap is opened at any point, and the watch is removed.

One or more embodiments of this disclosure provide a user of a wearable device for continuous user authentication, a user of biometrics data for continuous user authentication, a method for continuous user authentication with on demand data collection and on demand processing, a method for continuous user authentication with continuous data collection and on demand processing, a method for continuous user authentication with continuous data collection and continuous processing, use of wearable device to verify a previously confirmed authentication, use of wearable device to continuously verify a previously confirmed authentication, use of biometrics to verify a previously confirmed authentication, use of biometrics to continuously verify a previously confirmed authentication, a method for maintaining a coupling between a wearable device and a previously confirmed user authentication, use of skin conductance for maintain coupling between the wearable device and a previously confirmed user authentication, use of optical sensors for maintain coupling between the wearable device and a previously confirmed user authentication, and use of mechanical or electrical means to ascertain that the wearable device is still coupled to the user in the same manner as when the user identity was confirmed.

An embodiment of this disclosure uses a wearable device to allow the user to log into all of her devices without the need to individually log into them provided the wearable device is first authorized. The requirement that the wearable device be authorized improves the security of the system over other methods that simply use a "designated" device (such as a smart watch) to unlock the primary device when in close proximity. The security is improved by ensuring that the access is tied to the user and not a designated device (which can be stolen).

The wearable device can be authorized in multiple ways:

The user wears the wearable and enters a password (either directly on the wearable or on a device paired to the wearable, as such as a smart phone).

The user wears the wearable device and uses biometric (one or more) to authorize the wearable.

An added security feature is the ability to provide "intent confirmation". This is a method for the user to acknowledge that the action being enabled is indeed with the user's consent. For example, when a secure banking app on a mobile device is clicked, before providing access to the bank account, the user gets a notification on the wearable to confirm that she is the one performing the action.

Intent confirmation is configurable, providing a trade-off between control and convenience for the user. If the user desires convenience then the intent confirmation can be set to "implicit" meaning as long the authenticated wearable is within a pre-defined wireless range, access is granted without any action from the user wearing the wearable. If the user desires more control then the confirmation can be set to "explicit" meaning the user has to acknowledge by pushing a button, doing a pre-defined gesture etc. before access can be granted or requested action can be completed. Other "in-between" modes can also be set that trades-off convenience and control based on user's preference.

An example embodiment provides a wearable device providing authorization for specific functions of the mobile device. Such as, for example, a banking application, a password, any other application set by the user, and the like.

An example embodiment also provides a way to generate strong passwords for the user. By using this feature the user (while registering a new account or device) can use a very strong password for improved security without the headache or need to remember it.

In an embodiment, once the wearable device is authorized, the validity of the authorization persists (meaning no re-authorization is required) as long as the wearable has not been taken off the user's body. This can be accomplished is multiple ways Upon request, perform sensing and authentication of the user wearing the wearable device Continuous sensing, and upon request perform authentication of the user wearing the wearable device Continuous sensing and continuous authentication of the user wearing the wearable device Monitoring the state of the wearable device via sensors, mechanical design, user input or other methods to determine that device was taken off-body. Such as, for example—a current circuit that is broken when the strap of a watch is unhooked.

In an embodiment of this disclosure, the process of user authentication with biometrics can be done using a wearable device based multi-modal biometric approach. The differentiating factor here is the ability to do "unobtrusive" biometrics that minimizes the need for user input while doing biometrics.

In an embodiment of this disclosure, a mobile device requests user data from a wearable device. The user attributes can be biometric data, passwords, or other user data used in identifying a user. As used herein, identifying a user can be identifying attributes about a user, and not necessarily identify an identity of the user. Identifying a user is used to compare values from the user attributes to stored profiles.

A mobile device is provided for authentication that includes a memory element and processing circuitry coupled to the memory element. The memory element configured to store a plurality of user profiles. The processing circuitry is configured to identify a pairing between the wearable device and a device. The processing circuitry is configured to request an identity of a user of a wearable device. The wearable device retrieves the biometric, password, or other user data and sends this data to the mobile device. The processing circuitry also is configured to determine if the identified user matches a profile of the plurality of user profiles. The processing circuitry is also configured to responsive to the identified user matching the profile; determine if the profile provides authorization to access the device. The processing circuitry is also configured to responsive to the profile providing authorization to the device, send a message to the device authorizing access to the device.

In another embodiment, a wearable device is provided to detect whether the wearable device is connected to a user or not. The term connected could mean worn by a user, or on a body of a user. In this embodiment, a mobile device can request the wearable device to confirm whether the wearable device is connected to the user. The connection can identify whether to continue to grant access to the mobile device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wearable device, comprising:
    at least one transceiver, in the wearable device, the transceiver configured to communicate with a client device or a cloud based server; and
    processing circuitry, in the wearable device, coupled to the transceiver, the processing circuitry configured to:
    identify a pairing between the wearable device and the client device;
    identify attributes of a first user of the wearable device, wherein at least one of the attributes is a biometric, wherein the first user is one of a plurality of users of the wearable device, and wherein at least one of the plurality of users of the wearable device is an authorized user of the client device;
    compare the identified attributes of the first user to attributes corresponding to each one of a plurality of user profiles for the plurality of users of the wearable device stored in a memory element of the wearable device;
    determine if the identified attributes of the first user match a first or a second profile of the plurality of user profiles stored in the memory element of the wearable device;
    responsive to the identified attributes of the first user matching the first profile, determine if the first profile provides authorization for the first user to access the client device and authorization to access first specific functions of the client device;
    responsive to the first profile providing authorization to access the client device and authorization to access first specific functions, send a message to unlock the client device and allow access to the first specific functions;
    responsive to the identified attributes of the first user matching a second profile, determine if the second profile provides authorization to access the client device and authorization to access second specific functions of the client device;

responsive to the second profile providing authorization to access the client device and authorization to access the second specific functions, send a message to unlock the client device and allow access the second specific functions;

identify that the pairing no longer exists between the wearable device and the client device; and responsive to the pairing no longer existing, de-authorize access to the respective first or second specific functions.

2. The wearable device of claim 1, wherein identifying attributes of the first user of the wearable device comprises the processing circuitry configured to:
receive an input of a password.

3. The wearable device of claim 2, wherein determining if the identified attributes of the first user match the first or the second profile of the plurality of user profiles comprises the processing circuitry configured to:
compare the password to passwords associated with each one of the plurality of user profiles stored in the memory element of the wearable device.

4. The wearable device of claim 1, wherein a user configurable setting indicates whether a confirmation from the first user is required for access to the specific functions of the client device.

5. The wearable device of claim 4, wherein, when the confirmation is required, the confirmation is at least one of a pre-determined user action, a gesture, a password, and a push of a button.

6. The wearable device of claim 1, further comprising the processing circuitry configured to:
receive a request from the client device for a password;
generate the password; and
associate the password with the respective first or second profile.

7. The wearable device of claim 1, further comprising the processing circuitry configured to:
receive a request from the client device to re-authorize the first user;
responsive to the request, re-identify the attributes of the first user as the first user of the wearable device;
determine if the re-identified user attributes match the first or the second profile of the plurality of user profiles;
responsive to the re-identified attributes of the first user matching the first or the second profile, determine if the respective first or second profile provides authorization to access the client device and authorization to access respective first or second specific functions of the client device;
responsive to respective first or second profile providing authorization to access the client device and authorization to access respective first or second specific functions, send a message to the client device authorizing the re-identified user as the first user.

8. The wearable device of claim 1, further comprising the processing circuitry configured to:
continually monitor at least one biometric of the first user of the wearable device;
receive a request from the client device to verify the first user of the wearable device;
responsive to the request, compare the at least one biometric with the identified attributes of the first user in the respective first or second profile to verify the first user of the wearable device.

9. The wearable device of claim 1, further comprising the processing circuitry configured to:
continually monitor at least one biometric of the first user of the wearable device;
continually authorize the first user of the wearable device based on the continual monitoring.

10. The wearable device of claim 1, further comprising the processing circuitry configured to:
determine whether the wearable device is removed from the first user;
responsive to the wearable device being removed from the first user, de-authorize access to the client device.

11. The wearable device of claim 1, further comprising the processing circuitry configured to:
receive a request from the client device to authorize the first user of the wearable device for a function;
responsive to the request, re-identify attributes of the first user of the wearable device;
determine if the re-identified user attributes match the respective first or second profile of the plurality of user profiles;
responsive to the re-identified user attributes of the first user matching the respective first or second profile, determine if the respective first or second profile provides authorization for the respective first or second specific function;
responsive to the one profile providing access to the client device and the function, send a message to the client device authorizing the respective first or second specific function.

12. The wearable device of claim 1, wherein identifying attributes of the first user of the wearable device comprises:
receiving an input of a password.

13. The wearable device of claim 12, wherein determining if the identified attributes of the first user match the respective first or second profile of the plurality of user profiles comprises:
comparing the password to passwords associated with each one of the plurality of user profiles.

14. The wearable device of claim 1, wherein identifying the attributes of the first user of the wearable device comprises the processing circuitry configured to identify the first user of the wearable device as a function of a biometric, a password, or other user data.

15. The wearable device of claim 1, wherein the processing circuitry is configured to send the message to unlock the client device further in response to at least one of:
the wearable device being in proximity to the client device; or
entering of a password or fingerprint at the wearable device.

16. A method for authenticating a user, the method comprising:
identifying a pairing between a wearable device and a client device;
identifying attributes of a first user of the wearable device, wherein at least one of the attributes is a biometric, wherein the first user is one of a plurality of users of the wearable device, and wherein at least one of the plurality of users of the wearable device is an authorized user of the client device;
determining if the identified attributes of the first user match a first or a second profile of a plurality of user profiles stored in a memory element of the wearable device;
responsive to the identified attributes of the first user matching the first profile, determining if the first profile provides authorization for the first user to access the client device and authorization to first specific functions of the client device;

responsive to the first profile providing authorization to access the client device and first specific functions, sending a message to unlock the client device and to allow access to the first specific functions;

responsive to the identified attributes of the first user matching the second profile, determining if the second profile provides authorization for the first user to access the client device and authorization to second specific functions of the client device;

responsive to the second profile providing authorization to access the client device and second specific functions, sending a message to unlock the client device and to allow access to the second specific functions;

identifying that the pairing no longer exists between the wearable device and the client device; and responsive to the pairing no longer existing, deauthorizing access to respective first or second specific functions.

17. A wearable device, comprising:

at least one transceiver configured to communicate with a client device or a cloud based server; and processing circuitry coupled to the at least one transceiver, the processing circuitry configured to:

identify a pairing between the wearable device and the client device;

identify attributes of a first user of the wearable device, wherein at least one of the attributes is a biometric, wherein the first user is one of a plurality of users of the wearable device, and wherein at least one of the plurality of users of the wearable device is an authorized user of the client device;

compare the identified attributes of the first user to attributes corresponding to each one of a plurality of user profiles for the plurality of users of the wearable device stored in a memory element of the wearable device;

determine if the identified attributes of the first user match a first or a second profile of the plurality of user profiles, the first or the second profile corresponding to authorized users of the client device;

responsive to the identified attributes of the first user matching the first profile, determine if the first profile provides authorization for the first user to access the client device and authorization to access first specific functions of the client device; and receive periodic requests from the client device to re-identify the attributes of the first user and verify that the re-identified attributes of the first user of the wearable device still match the first profile and that authorization to access the first specific functions of the client device is still valid.

* * * * *